(12) United States Patent
Sakai et al.

(10) Patent No.: US 7,008,977 B2
(45) Date of Patent: Mar. 7, 2006

(54) COLORED FINE RESIN PARTICLES AND PRODUCTION PROCESS THEREOF, AQUEOUS DISPERSION OF COLORED FINE RESIN PARTICLES AND PRODUCTION PROCESS OF AQUEOUS DISPERSION OF COLORED FINE RESIN PARTICLES, INK, INK CARTRIDGE, RECORDING UNIT, INK-JET RECORDING APPARATUS, AND INK-JET RECORDING PROCESS

(75) Inventors: Junichi Sakai, Tokyo (JP); Masaaki Hiro, Kanagawa (JP); Hideyuki Takai, Kanagawa (JP); Keishi Danjo, Kanagawa (JP); Makiko Endo, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 213 days.

(21) Appl. No.: 10/179,844

(22) Filed: Jun. 26, 2002

(65) Prior Publication Data
US 2003/0050362 A1    Mar. 13, 2003

(30) Foreign Application Priority Data
Jun. 29, 2001 (JP) ............................. 2001-199968
Jun. 29, 2001 (JP) ............................. 2001-199971

(51) Int. Cl.
C08K 9/10       (2006.01)
C09D 11/10      (2006.01)

(52) U.S. Cl. .................. 523/200; 523/160; 523/201; 523/206

(58) Field of Classification Search ................ 523/160, 523/161, 200, 201, 205, 206; 106/31.6
See application file for complete search history.

(56) References Cited

U.S. PATENT DOCUMENTS

| | | | |
|---|---|---|---|
| 3,133,893 A | 5/1964 | Newman ..................... 260/41 |
| 3,876,603 A | 4/1975 | Makhlouf ................... 260/31.2 |
| 4,132,562 A | 1/1979 | Burke, Jr., et al. ..... 106/308 M |
| 4,681,912 A | 7/1987 | Durand et al. ............... 524/827 |
| 4,935,456 A | 6/1990 | Huang et al. ................ 523/201 |
| 5,171,772 A | 12/1992 | Hoy et al. .................... 524/457 |
| 5,254,428 A | 10/1993 | Ishikawa et al. ............. 430/138 |
| 5,863,696 A | 1/1999 | Koyama et al. ............. 430/137 |
| 6,498,203 B1 * | 12/2002 | Kito et al. .................... 523/161 |
| 6,602,333 B1 * | 8/2003 | Miyabayashi ............. 106/31.27 |
| 6,652,084 B1 * | 11/2003 | Teraoka et al. .............. 347/100 |
| 6,727,318 B1 * | 4/2004 | Mathauer et al. ........... 524/801 |
| 2003/0008939 A1 * | 1/2003 | Ando et al. .................. 523/160 |
| 2003/0106462 A1 * | 6/2003 | Yatake et al. ............. 106/31.59 |

FOREIGN PATENT DOCUMENTS

| | | |
|---|---|---|
| EP | 0 209 879 A2 | 1/1987 |
| EP | 0 454 980 A1 | 11/1991 |
| EP | 0 572 128 A2 | 12/1993 |
| GB | 2 250 020 A | 5/1992 |
| JP | 9-279073 A | 10/1997 |
| JP | 10251567 A * | 9/1998 |
| JP | 11-12512 A | 1/1999 |
| JP | 2001131213 A * | 5/2001 |
| JP | 2002012802 A * | 1/2002 |
| WO | WO 99/63006 | 12/1999 |

OTHER PUBLICATIONS

Machine Translation of JP 2002012802 A (2002).*
Machine Translation of JP 2001-131213 (2001).*
Machine Translation of JP 10-251567 (1998).*
Database WPI, Derwent Publications, Inc., XP-002235339 with respect to JP 09279073 of Oct. 28, 1997.
Database WPI, Derwent Publications, Inc., XP-002235340 with respect to JP11012512 of Jan. 19, 1999.
Database WPI, Derwent Publications, Inc., XP-002235341 with respect to JP 05061253 of Mar. 12, 1993.
Database WPI, Derwent Publications, Inc., XP-002235343 with respect to JP 59027924 of Feb. 14, 1984.
Database WPI, Derwent Publications, Inc., XP-002235344 with respect to JP 04036379 of Feb. 6, 1991.
Database WPI, Derwent Publications, Inc., XP-002235342 with respect to JP 2002038031 of Feb. 6, 2002.

* cited by examiner

*Primary Examiner*—Callie Shosho
(74) *Attorney, Agent, or Firm*—Fitzpatrick, Cella, Harper & Scinto

(57) ABSTRACT

The invention provides colored fine resin particles useful as coloring materials for inks which can provide images having good water fastness, weather fastness and rub-off resistance and are excellent in dispersion stability, and a production process thereof. The colored fine resin particles have a structure in which a pigment coated with a water-insoluble resin is encapsulated with a copolymer composed of at least a polymerizable unsaturated monomer and a reactive emulsifier.

36 Claims, 3 Drawing Sheets

COLORED FINE RESIN PARTICLES AND PRODUCTION PROCESS THEREOF, AQUEOUS DISPERSION OF COLORED FINE RESIN PARTICLES AND PRODUCTION PROCESS OF AQUEOUS DISPERSION OF COLORED FINE RESIN PARTICLES, INK, INK CARTRIDGE, RECORDING UNIT, INK-JET RECORDING APPARATUS, AND INK-JET RECORDING PROCESS

BACKGROUND OF THE INVENTION

1. Field of the Invention

The present invention relates to colored fine resin particles and a production process thereof, an aqueous dispersion of the colored fine resin particles and a production process thereof, an ink, an ink cartridge, a recording unit, an ink-jet recording apparatus, and an ink-jet recording process. More particularly, the colored fine resin particles and the aqueous dispersion thereof are useful as, for example, coloring materials for ink-jet inks.

2. Related Art

As coloring materials in the conventional inks used in ink-jet recording method, for example, water-soluble dyes are used. However, recorded images by such an ink are required to more improve water fastness. Many of the water-soluble dyes to date are insufficient in weather fastness, and so it is also simultaneously required to more improve the weather fastness. In reply to these requirements, as means for improving the water fastness and weather fastness of recorded articles, there is a technique in which a pigment is used as a coloring material, and the pigment is dispersed in water to provide an ink. However, it is difficult to reconcile the dispersion stability of a pigment with the ejection stability of ink-jet recording. In addition, there is room to still improve the rub-off resistance of recorded images obtained by pigment inks on, particularly, plain paper.

Many means for improving these problems have been proposed to date. For example, there is a technique in which a resin is added to a pigment ink for the purpose of improving the rub-off resistance. However, a problem that the viscosity of the ink is increased by the resin added has been left. Although a technique in which resin particles are added for the purpose of reducing the viscosity increase of the ink has been proposed, the improvement in rub-off resistance has been insufficient because the ink is in a state that the resin particles and the pigment are separately dispersed therein.

On the other hand, a technique in which a pigment is coated with a resin has been proposed. A technique in which the adsorptivity of such a resin to the pigment is improved by controlling the hydrophobic moiety and hydrophilic moiety of the resin has come to be proposed. However, a portion of the resin, which is not adsorbed on the pigment, but suspends, remains in the ink system according to a production process of mixing the pigment and the resin with each other, whereby in some cases, viscosity increase of the resulting ink has been brought on, or the ejection stability of the ink has been impaired. As a production process by which such a free resin is not caused to remain, a technique in which a pigment is added at a stage of a monomer prior to the preparation of a resin, and the monomer is polymerized in the presence of the pigment to coat the pigment with the resin has been proposed.

For example, Japanese Patent Application Laid-Open No. 9-279073 discloses a technique in which a coloring material having affinity for an unsaturated monomer is added to this monomer, and the resultant mixture was subjected to emulsion polymerization to obtain colored fine resin particles, while Japanese Patent Application Laid-Open No. 11-12512 discloses a technique in which a pigment is added to an ethylenically unsaturated monomer, and the resultant mixture was subjected to emulsion polymerization to obtain an ink for ink-jet.

SUMMARY OF THE INVENTION

According to an investigation by the present inventors, however, the production process described in Japanese Patent Application Laid-Open No. 9-279073 has been difficult to obtain colored fine resin particles having a small particle diameter. A mass ratio of the pigment to the monomer in this case is about $1/10$. The colored fine resin particles containing the coloring material at such a low concentration fails to achieve sufficient optical density of images upon preparation of inks therefrom. On the other hand, when the concentration of the pigment, i.e., the coloring material, upon dispersion is increased for the purpose of increasing the pigment concentration in the resulting ink, the viscosity of the resultant mixture becomes extremely high, and so it is more difficult to disperse the colored fine resin particles in a state of fine particles suitable for use in inks.

According to an investigation by the present inventors, the process described in Japanese Patent Application Laid-Open No. 11-12512 has also been difficult to control a particle diameter, and it has been inferred that the stability of the particle diameter with time is impaired. In addition, according to an example thereof, a mass ratio of the pigment to the polymerizable unsaturated monomer is as low as about $1/10$. When the colored fine resin particles containing the pigment at such a low concentration is used as a coloring material for inks, sufficient optical density of images cannot be achieved. On the other hand, when a solid concentration in such an ink as described in the example is increased for the purpose of raising the optical density, the viscosity of the resultant ink is increased, which offers a problem that the ejection properties of the ink are deteriorated when the ink is used in ink-jet recording.

More specifically, the conventional processes have been difficult to finely disperse the pigment in the polymerizable unsaturated monomer and thus insufficient from the viewpoint of dispersion stability. According to an investigation by the present inventors, when dispersion stability is insufficient at the time the unsaturated monomer and the pigment have been emulsified, colored fine resin particles obtained by using them undergo a scatter of particle diameter distribution and become insufficient in shelf stability and ejection stability.

It is therefore an object of the present invention to provide colored fine resin particles suitable for use in inks which can provide images having good water fastness, weather fastness and rub-off resistance and are excellent in dispersion stability, and a production process thereof.

Another object of the present invention is to provide an aqueous dispersion of colored fine resin particles useful as a coloring material for inks which can provide images having good water fastness, weather fastness and rub-off resistance and are excellent in dispersion stability, and a production process thereof.

A further object of the present invention is to provide an ink which can provide images having good water fastness, weather fastness and rub-off resistance and is excellent in dispersion stability and also in ejection stability from a recording head when used in, for example, ink-jet recording, and an ink-jet recording apparatus, a recording unit, an ink cartridge and an ink-jet recording method using such an ink.

A still further object of the present invention is to provide colored fine resin particles useful as a coloring material for inks which can provide images having good water fastness, weather fastness and rub-off resistance, are excellent in dispersion stability and have high pigment concentration and coloring ability, a process for efficiently producing such fine particles, and a dispersion of the colored fine resin particles.

A still further object of the present invention is to provide an ink which can provide images having good water fastness, weather fastness and rub-off resistance and has high pigment concentration and coloring ability, and a recording unit, an ink cartridge, an ink-jet recording apparatus and an ink-jet recording method using such an ink.

The above objects can be achieved by the present invention described below.

In one embodiment of the present invention, there are thus provided colored fine resin particles having a structure in which a pigment coated with a water-insoluble resin is encapsulated with a copolymer composed of at least a polymerizable unsaturated monomer and a reactive emulsifier.

In another embodiment of the present invention, there is provided a process for producing colored fine resin particles, which comprises the steps of emulsifying a pigment coated with a water-insoluble resin, a polymerizable unsaturated monomer, a reactive emulsifier and a polymerization initiator in an aqueous medium, and polymerizing the polymerizable unsaturated monomer.

In a further embodiment of the present invention, there is provided an aqueous dispersion of colored fine resin particles, wherein the colored fine resin particles have a structure that a pigment coated with a water-insoluble resin is encapsulated with a copolymer composed of at least a polymerizable unsaturated monomer and a reactive emulsifier, and are in a dispersed.

In a still further embodiment of the present invention, there is provided a process for producing colored fine resin particles, which comprises the steps of emulsifying at least a polymerizable unsaturated monomer, a colorant, an emulsifier and a polymerization initiator in an aqueous medium and polymerizing the polymerizable unsaturated monomer, wherein a phase-inversion emulsification method is used in the emulsifying step.

In a yet still further embodiment of the present invention, there are provided colored fine resin particles obtained by the production process of colored fine resin particles described above.

In a yet still further embodiment of the present invention, there is provided a process for producing an aqueous dispersion of colored fine resin particles, which comprises the steps of emulsifying at least a polymerizable unsaturated monomer, a colorant, an emulsifier and a polymerization initiator in an aqueous medium and polymerizing the polymerizable unsaturated monomer, wherein a phase-inversion emulsification method is used in the emulsifying step.

In a yet still further embodiment of the present invention, there is provided an ink comprising the colored fine resin particles described above and a liquid medium.

In a yet still further embodiment of the present invention, there is provided a recording unit comprising an ink container portion with the ink described above held therein and a head for ejecting the ink.

In a yet still further embodiment of the present invention, there is provided an ink cartridge comprising an ink container portion with the ink described above held therein.

In a yet still further embodiment of the present invention, there is provided an ink-jet recording apparatus comprising an ink container portion with the ink described above held therein and a head for ejecting the ink.

In a yet still further embodiment of the present invention, there is provided an ink-jet recording process comprising the step of ejecting the ink described above by an ink-jet system.

DETAILED DESCRIPTION OF THE INVENTION

Figure 1:
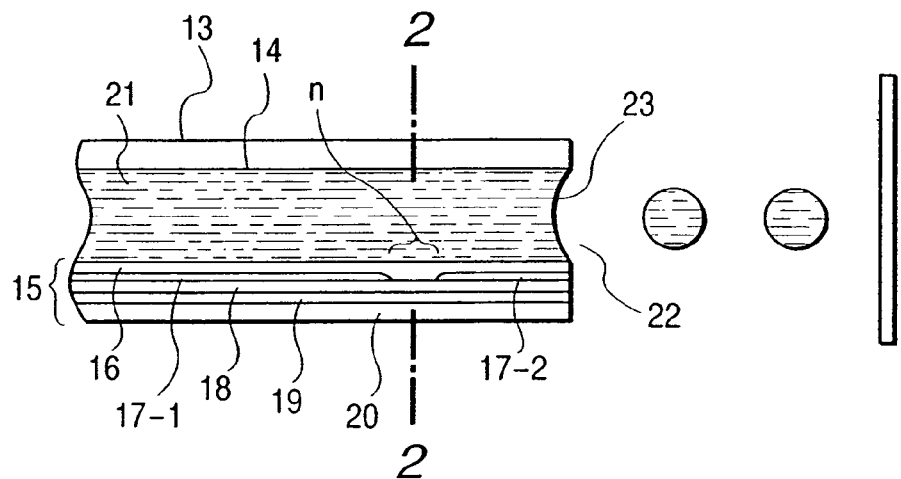
FIG. 1 is a longitudinal cross-sectional view illustrating a head of an ink-jet recording apparatus.

The present invention will hereinafter be described in more detail by the preferred embodiments of the invention.

(First Embodiment)

The colored fine resin particles according to an embodiment of the present invention have a structure in which a pigment coated with a water-insoluble resin is further encapsulated with a copolymer of a polymerizable unsaturated monomer and a reactive emulsifier. Such colored fine resin particles can be obtained by, for example, the steps of emulsifying a pigment coated with a water-insoluble resin, a polymerizable unsaturated monomer, an emulsifier and a polymerization initiator in an aqueous medium and polymerizing the polymerizable unsaturated monomer.

The pigment is coated with the water-insoluble resin, whereby the surfaces of pigment particles do not come into direct contact with each other, and so the pigment is hard to cause aggregation. In addition, the water-insoluble resin is dissolved in the polymerizable unsaturated monomer, whereby the pigment is easily dispersed in a state of fine particles in the polymerizable unsaturated monomer to provide a pigment dispersion having high dispersion stability.

The colored fine resin particles according to the present invention, which are high in dispersion stability and excellent in shelf stability and ejection stability, can be provided by using this dispersion. Since the pigment coated with the water-insoluble resin in advance is used, there is no need to disperse the pigment in the polymerizable unsaturated monomer and/or water prior to or upon emulsification like the conventional processes, and so colored fine resin particles containing the pigment at a high concentration, which are extremely good in productivity and also extremely good in coloring ability because the pigment is dispersed in a state of fine particles, and inks containing such fine particles can be easily provided.

In order to produce such colored fine resin particles according to this embodiment of the present invention, at least a pigment coated with a water-insoluble resin in advance, a polymerizable unsaturated monomer, an emulsifier and a polymerization initiator are used as described above. These constituents will hereinafter be respectively described.

As the pigment coated with the water-insoluble resin in advance, may be used that referred to as the so-called processed pigment. More specifically, commercially available processed pigments such as those called "color chip" (products of Taihei Chemicals Limited; Taisei Kako K.K., etc.) obtained by kneading a pigment and a resin under heat by a twin roll mill or the like, and Microlith (product of Ciba Specialty Chemicals Co., Ltd.) may be used. Further, those obtained by any of publicly known processes such as a simple coacervation process in which a pigment is dispersed in a resin solution, and a poor solvent is added to this dispersion to deposit the resin on the surface of the pigment may also be used.

No particular limitation is imposed on pigments usable in the present invention. However, for example, pigments mentioned below may be suitably used.

As carbon black as a black pigment, may preferably be used carbon black produced in accordance with the furnace process or channel process. Such carbon black preferably has properties that the primary particle diameter is 15 to 40 nm, the specific surface area is 50 to 300 m2/g as determined in accordance with the BET method, the oil absorption is 40 to 150 ml/100 g as determined by using DBP, the volatile matter is 0.5 to 10% by mass, and the pH is 2 to 9.

As examples of the carbon black having such properties, may be used commercially available products such as No. 2300, No. 900, MCF 88, No. 40, No. 52, MA 7, MA 8 and No. 2200B (trade names; all, products of Mitsubishi Kagaku Co.); RAVEN 1255 (trade name; product of Columbian Carbon Japan Limited); REGAL 400R, REGAL 660R and MOGUL L (trade names; all, products of Cabot); and Color Black FW1, Black FW18, Color Black S170, Color Black S150, Printex 35 and Printex U (trade names; all, products of Degussa). Those newly prepared for the present invention may also be used.

Examples of yellow pigments include C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83.

Examples of magenta pigments include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112, C.I. Pigment Red 122 and C.I. Pigment Violet 19. As magenta pigments, are particularly preferred quinacridone pigments.

Examples of cyan pigments include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6. With respect to the pigments of all the above-described colors, those newly prepared may also be used. As cyan pigments, are particularly preferred metal phthalocyanine pigments, and further preferred copper phthalocyanine pigments.

The water-insoluble resin with which the pigment is coated is selected in view of the adsorptivity on the pigment used and the solubility in the polymerizable unsaturated monomer used. Particularly, vinyl resins such as vinyl chloride resins, vinyl acetate resins, vinyl chloride/vinyl acetate copolymer resins and polyvinyl acetal resins, cellulose resins and acrylic resins are preferred. Among these, vinyl chloride/vinyl acetate copolymer resins are most suitable from viewpoint of finely stabilizing the pigment in the polymerizable unsaturated monomer. Two or more water-insoluble resins may be used in combination as needed.

A mass ratio of the pigment to the coating water-insoluble resin for it is preferably within a range of from 7/3 to 3/7, more preferably from 6/4 to 4/6. If the pigment is too great, there is a fear that the pigment aggregates in the polymerizable unsaturated monomer. If the resin is too great on the other hand, the concentration of the pigment in the resulting colored fine resin particles becomes low though depending on the amount of the unsaturated monomer used, and so it is hard to provide a pigment ink of high concentration.

Examples of the polymerizable unsaturated monomer include vinyl aromatic hydrocarbons, (meth)acrylic esters, (meth)acrylamide, alkyl-substituted (meth)acrylamide, N-substituted maleimide, maleic anhydride, (meth)acrylonitrile, methyl vinyl ketone, vinyl acetate and vinylidene chloride.

Specific examples of the vinyl aromatic hydrocarbons include styrene, α-methylstyrene, o-, m- or p-chlorostyrene, p-ethylstyrene and divinylbenzene. These monomers may be used either singly or in any combination thereof. However, the vinyl aromatic hydrocarbons used in the present invention are not limited thereto.

Specific examples of the (meth)acrylic esters include methyl acrylate, ethyl acrylate, butyl acrylate, 2-ethylhexyl acrylate, cyclohexyl acrylate, phenyl acrylate, methyl methacrylate, hexyl methacrylate, 2-ethylhexyl methacrylate, ethyl β-hydroxyacrylate, propyl γ-hydroxyacrylate, butyl δ-hydroxyacrylate, ethyl β-hydroxymethacrylate, ethylene glycol dimethacrylate and tetraethylene glycol dimethacrylate. However, the (meth)acrylic esters used in the present invention are not limited thereto.

These polymerizable unsaturated monomers may be used either singly or in any combination thereof. It goes without saying that a small amount of a water-soluble monomer may be added to conduct polymerization for the purpose of improving the nature of the resulting colored fine resin particles according to uses. Examples of the water-soluble monomer include those having an anionic group such as a sulfonic group, phosphoric group or carboxyl group. These acids may be in any form of an alkali metal salt such as a sodium salt, an ammonium salt, an amine salt, and a free acid. Suitable examples thereof include styrenesulfonic acid, sodium styrenesulfonate, 2-acrylamido-2-methylpropenesulfonic acid, 2-hydroxymethylmethacryloyl phosphate, 3-chloro-2-hydroxypropylmethacryloyl phosphate, acrylic acid, methacrylic acid, fumaric acid, crotonic acid, tetrahydroterephthalic acid, itaconic acid and maleic acid.

As the emulsifier used in the present invention, a nonionic, anionic or ampholytic emulsifier may be used. A reactive emulsifier may preferably be used for the purpose of reducing the amount of a free emulsifier to control the penetrability of the resulting ink and further improving the water fastness of recorded images.

The reactive emulsifier means an anionic or nonionic emulsifier having at least one unsaturated double bond in its molecule, and examples thereof include sulfosuccinic esters and alkyl phenol ethers. Examples of the nonionic reactive emulsifier include those having a polyoxyethylene group in their molecules. Specific examples thereof include polyoxyethylene allylglycidylnonyl phenyl ether, "Adeka Reasoap NE" (trade name, product of Asahi Denka Kogyo K.K.) and polyoxyethylenenonyl propenyl ether, "Aqualon RN" (trade name, product of Dai-ichi Kogyo Seiyaku Co., Ltd.). Examples of the anionic reactive emulsifier include sulfonic acid (salt) type, carboxylic acid (salt) type and phosphoric acid ester type. Specific examples thereof include the sulfate salt of polyoxyethylene allylglycidylnonyl phenyl ether, "Adeka Reasoap SE" (trade name, product of Asahi Denka Kogyo K.K.), the sulfate salts of polyoxyethylenenonyl propenyl ether, "Aqualon HS" and "Aqualon BC" (trade names, products of Dai-ichi Kogyo Seiyaku Co., Ltd.). Besides, examples of those having other structures include "Eleminol JS-2" and "Eleminol RS-30" (trade names, products of Sanyo Chemical Industries, Ltd.), "Latemul" (trade name, product of Kao Corporation), and "New Frontier" (trade name, product of Asahi Denka Kogyo K.K.). However, the reactive emulsifiers are not limited thereto. These reactive emulsifier may be used either singly or in any combination thereof, or in combination with any ordinary emulsifier. The amount of such a reactive emulsifier used is preferably 5 to 50% by mass, more preferably 10 to 40% by mass based on the total mass of the monomers used.

As the polymerization initiator, may be used a water-soluble or oil-soluble persulfate, peroxide, azo compound or redox composition composed of a combination of a peroxide with a reducing agent such as a sulfite. Examples thereof include ammonium persulfate, potassium persulfate, sodium persulfate, hydrogen peroxide, t-butyl hydroperoxide, t-butyl peroxybenzoate, 2,2-azobis-isobutyronitrile, 2,2-azobis (2-diaminopropane) hydrochloride and 2,2-azobis (2,4-dimethylvaleronitrile).

The amount of such a polymerization initiator used is preferably 0.01 to 10% by mass, more preferably 0.05 to 5% by mass based on the total mass of the monomers used.

Incidentally, the colored fine resin particles according to this embodiment may contain additives such as an ultraviolet absorbent, antioxidant and development-improving agent as needed.

As an emulsifying method, may be used a direct emulsification method in which a dispersion of the pigment coated with the water-insoluble resin in advance in the polymerizable unsaturated monomer is emulsified in an aqueous medium, to which the emulsifier has been added, by a dispersing machine such as a homomixer, line mixer or high pressure homogenizer, or a natural emulsification method in which the emulsifier is added to a dispersion of the pigment coated with the water-insoluble resin in advance in the polymerizable unsaturated monomer, and the mixture is poured into a great amount of water. Further, the use of a phase-inversion emulsification method, in which the emulsifier is added to a dispersion of the pigment coated with the water-insoluble resin in advance in the polymerizable unsaturated monomer, and water is gradually added to the mixture with stirring, is preferred because the particle diameter of the resulting dispersion is more unified, and the particle diameter distribution is narrowed.

As a polymerization method, may be used either an emulsification polymerization method using a water-soluble polymerization initiator or a suspension polymerization method using an oil-soluble polymerization initiator. The average particle diameter of the colored fine resin particles obtained after the polymerization is preferably 500 nm or smaller, more preferably 200 nm or smaller. When the average particle diameter falls within such a numerical range, the colored fine resin particles are hard to cause precipitation even when the resulting ink is stored for a long period of time, and the dispersion stability can be stably retained for a long period of time. In the present invention, the average particle diameter is a value determined in accordance with the cumulant analysis that a scattering intensity distribution attributable to fine particles detected by the dynamic light scattering method is applied to a normal distribution to calculate out an average particle diameter.

(Second Embodiment)

A feature of the colored fine resin particles according to a second embodiment of the present invention resides in that it can be obtained by a process for producing colored fine resin particles, comprising the steps of (i) emulsifying at least a polymerizable unsaturated monomer, a colorant, an emulsifier and a polymerization initiator in an aqueous medium; and (ii) polymerizing the polymerizable unsaturated monomer, wherein a phase-inversion emulsification method is used in the emulsifying step.

The phase-inversion emulsification method is a method in which water is added portion-wise to a liquid oil, to which an emulsifier has been added, with stirring. When water droplets is gradually added to oil, a W/O type emulsion is first prepared. The viscosity of the emulsion increases as the amount of water increases, and the emulsion is phase-inverted to an O/W type emulsion before long. The feature of the phase-inversion emulsification method is to pass through a point of this phase inversion. More specifically, stirring is conducted with fully high shearing force at the phase inversion point at which particles and a continuous layer dispersing them therein change places with each other, whereby an emulsion having a very narrow particle diameter distribution and an even and small particle diameter can be provided. The emulsion obtained by the phase-inversion emulsification method is far excellent in stability.

The phase-inversion emulsification method is generally performed by using a beaker and a stirring rod. In the present invention, however, a dispersing machine may also be used for the purpose of more strongly and evenly conducting the stirring at the phase inversion point to obtain an emulsion having an evener and smaller particle diameter. Examples of the dispersing machine include a three-one motor, homomixer and homogenizer. The mechanical dispersing force is applied to the phase-inversion emulsification method in such a manner, whereby an emulsion narrow in particle diameter distribution, small in particle diameter and far excellent in stability, which cannot be obtained to date, can be provided.

In the production process of the colored fine resin particles according to this embodiment of the present invention, at least a polymerizable unsaturated monomer, a colorant, an emulsifier and a polymerization initiator are used, and the phase-inversion emulsification method is used. These constituents will hereinafter be respectively described.

(Polymerizable Unsaturated Monomer)

As the polymerizable unsaturated monomer, may be used the same monomers as described in the first embodiment.

(Colorant)

As the colorant, that dissolved or dispersed in the polymerizable unsaturated monomer is selected, and examples thereof include dyes, pigments and processed pigments. In this embodiment, the processed pigments generally mean those obtained by applying a step expected to impart an additional function to an ordinary pigment producing step, such as self-dispersing pigments in which at least one functional group is bonded directly or through another atomic group to the surface of a pigment, and pigments coated with a pigment dispersant or resin. In the present invention, pigments and processed pigments are preferably used because they are excellent in weather fastness. When a pigment is used, a pigment coated with a water-insoluble resin having adsorptivity on the pigment and compatibility with the polymerizable unsaturated monomer used in advance is particularly preferred in view of the dispersibility in the polymerizable unsaturated monomer.

No particular limitation is imposed on pigments usable in the present invention. However, for example, pigments mentioned below may be suitably used.

As carbon black as a black pigment, may preferably be used carbon black produced in accordance with the furnace process or channel process. Such carbon black preferably has such properties that the primary particle diameter is 15 to 40 nm, the specific surface area is 50 to 300 m2/g as determined in accordance with the BET method, the oil absorption is 40 to 150 ml/100 g as determined by using DBP, the volatile matter is 0.5 to 10% by mass, and the pH is 2 to 9.

As examples of the carbon black having such properties, may be used commercially available products such as No. 2300, No. 900, MCF 88, No. 40, No. 52, MA 7, MA 8 and No. 2200B (trade names; all, products of Mitsubishi Kagaku Co.); RAVEN 1255 (trade name; product of Columbian Carbon Japan Limited); REGAL 400R, REGAL 660R and MOGUL L (trade names; all, products of Cabot); and Color Black FW1, Black FW18, Color Black S170, Color Black S150, Printex 35 and Printex U (trade names; all, products of Degussa). Those newly prepared for the present invention may also be used.

Examples of yellow pigments include C.I. Pigment Yellow 1, C.I. Pigment Yellow 2, C.I. Pigment Yellow 3, C.I. Pigment Yellow 12, C.I. Pigment Yellow 13, C.I. Pigment Yellow 16, C.I. Pigment Yellow 17, C.I. Pigment Yellow 55, C.I. Pigment Yellow 74, C.I. Pigment Yellow 83, C.I. Pigment Yellow 93, C.I. Pigment Yellow 97, C.I. Pigment Yellow 98, C.I. Pigment Yellow 110, C.I. Pigment Yellow 128, C.I. Pigment Yellow 138, C.I. Pigment Yellow 139, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180 and C.I. Pigment Yellow 185.

Examples of magenta pigments include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112, C.I. Pigment Red 122 and C.I. Pigment Violet 19. As magenta pigments, are particularly preferred quinacridone pigments.

Examples of cyan pigments include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6. As cyan pigments, are particularly preferred metal phthalocyanine pigments, and further preferred copper phthalocyanine pigments.

With respect to the pigments of all the above-described colors, those newly prepared may also be used.

As the processed pigments usable in the present invention, those having dispersibility in the polymerizable unsaturated monomer used are selected. For example, those subjected to a surface treatment for improving the dispersibility in the polymerizable unsaturated monomer are preferably used.

The use of pigments coated with a water-insoluble resin having adsorptivity on the pigments used in the first embodiment and compatibility with the polymerizable unsaturated monomer used in advance is more preferred because viscosity increase upon phase inversion is prevented, and so inks having high pigment concentration and excellent coloring ability are provided.

(Emulsifier)

As the emulsifier, the same emulsifiers as described in the first embodiment may be used. In order to stably conduct emulsification and impart sufficient water fastness to images formed by an ink containing the resulting colored fine resin particles, the amount of the emulsifier used is preferably 5 to 50% by mass, more preferably 10 to 40% by mass based on the total mass of the monomers used.

(Polymerization Initiator)

As the polymerization initiator, the same polymerization initiators as described in the first embodiment may be used. However, a polymerization initiator soluble in the monomer used is suitably used because the polymerization is preferably conducted in accordance with a suspension polymerization process by which transfer of the monomer does not occur.

The amount of such a polymerization initiator used is preferably 0.01 to 10% by mass, more preferably 0.05 to 5% by mass based on the total mass of the monomers used.

Incidentally, the colored fine resin particles according to this embodiment may contain additives such as an ultraviolet absorbent, antioxidant and development-improving agent in addition to the polymerizable unsaturated monomer, colorant, emulsifier and polymerization initiator.

The process for polymerizing the polymerizable unsaturated monomer according to this embodiment will now be described.

In the polymerization process, may be used, for example, an emulsion polymerization process using a pre-emulsifying process, and a suspension polymerization process. The emulsion polymerization process is similar to the suspension polymerization process in that water is used as a medium. However, they are different from each other in that the emulsion polymerization process uses a polymerization initiator insoluble in the monomer as the polymerization initiator, while the suspension polymerization process uses a polymerization initiator soluble in the monomer. The emulsion polymerization and suspension polymerization thereby come to follow the entirely different polymerization mechanisms from each other.

More specifically, in the suspension polymerization process, the polymerization is allowed to progress within individual monomer particles, while in the emulsion polymerization process, the polymerization is initiated by diffusion of the polymerization initiator into micelles formed by the emulsifier and a small amount of the monomer in the system, and the polymerization is allowed to progress by feeding the monomer to the micelles from oil droplets of the monomer. In the present invention, it is preferred that monomer particles containing the colorant be formed by pre-emulsification using the phase-inversion method, and the particles be polymerized while retaining the original form thereof, thereby obtaining the colored fine resin particles. Therefore, the polymerization is preferably conducted in accordance with the suspension polymerization process which is a system that does not cause transfer of the monomer.

In the conventional suspension polymerization process, a stabilizer such as polyvinyl alcohol is added for the purpose of retaining the stable dispersed state of a monomer, and polymerization is conducted while vigorously stirring the monomer to disperse it. Therefore, it has been known that polydisperse particles greater in particle diameter compared with the emulsion polymerization are generally obtained. However, since the stable monomer particles having an even and small particle diameter can be formed by the pre-emulsification using the phase-inversion emulsification method when the process according to the present invention is used, so that particles obtained by suspension-polymerizing such particles are also stable and have an even and small particle diameter.

The average particle diameter of the colored fine resin particles obtained after the polymerization is preferably 500 nm or smaller, more preferably 200 nm or smaller. It is further preferred that as the particle size distribution thereof, the 10% cumulative value be 25 nm or greater, and the 90% cumulative value be 1100 nm or smaller. In the present invention, the average particle diameter is a value determined in accordance with the cumulant analysis that a scattering intensity distribution attributable to fine particles detected by the dynamic light scattering method is applied to a normal distribution to calculate out an average particle diameter.

The particle size distribution is found from the frequency distribution when the scattering intensity detected by the above-described measuring method is analyzed by the Marquadt analysis of the histogram method. The particle size distribution of fine particles is found from the particle diameters at the time the cumulative values are 10-% and 90% when the scattering intensity is cumulated from the small-particle diameter side. In these measurements, may be suitably used apparatus capable of measuring the particle size distribution by the dynamic light scattering method, such as an electrophoretic light scattering photometer, ELS-8000 (trade name, manufactured by Otsuka Denshi K.K.). The analytic processing can be performed in accordance with attached software.

When the average particle diameter and particle size distribution fall within the above respective ranges, the dispersion stability of the colored fine resin particles is improved, and so the colored fine resin particles are hard to cause aggregation, precipitation or the like even when stored for a long period of time under low-temperature and high-temperature environments. In addition, since the particle diameter is even, clogging within an ink-jet recording apparatus becomes little when they are used in inks for ink-jet recording, and so the ejection stability is improved.

In order to form colored fine resin particles having an average particle diameter within the above range, the average particle diameter of the monomer particles after the phase-inversion emulsification is preferably 500 nm or smaller, more preferably 200 nm or smaller.

The colored fine resin particles obtained by the first and second embodiments described above are those dispersed in an aqueous medium (in the present invention, these are referred to as aqueous dispersions of colored fine resin particles). When an ink is prepared by using the colored fine resin particles according to the present invention, the aqueous dispersion of the colored fine resin particles may be used as it is. Alternatively, water may be removed from the aqueous dispersion of the colored fine resin particles by a method (for example, distillation, centrifugation, filtration, spray drying, etc.) known per se in the art according to the composition of the intended ink to take them out as colored fine resin particles, and they may be then dispersed again in a proper solvent, for example, an aqueous medium or oily medium to prepare an ink.

Since the colored fine resin particles produced in accordance with the present invention are good in water fastness, ink images obtained by using them are good in weather fastness and rub-off resistance, and the dispersion stability thereof is excellent, they may be suitably used in various kinds of recording inks. Since they are particularly good in dispersibility in water, they are suitably used in water-based inks for ink-jet recording.

The ink using the colored fine resin particles is constituted by retaining the dispersed state of the colored fine resin particles in the aqueous medium. The aqueous medium preferably contains at least water as a constituent. The proportion of water in the total mass of the ink is preferably, for example 20 to 95% by mass, particularly 40 to 95% by mass, more preferably 60 to 95% by mass.

The aqueous medium may contain a water-soluble organic solvent. The amount of the water-soluble organic solvent used is 2 to 60% by mass based on the total mass of the ink. Specific examples, of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether and diethylene glycol monomethyl (or monoethyl) ether; N-methyl-2-pyrrolidone; 1,3-dimethyl-2-imidazolidinone; sulfolane; dimethyl sulfoxide; 2-pyrrolidone; cyclic amide compounds such as $\epsilon$-caprolactam; and imide compounds such as succinimide.

The inks according to the present invention may preferably be used in ink-jet recoding method in which an ink is ejected from a recording head by thermal energy or mechanical energy and applied to a recording medium, thereby recording images. In order to make the inks according to this embodiment particularly suitable for use in ink-jet recording, the inks may preferably be controlled so as to have, as their own physical properties at 25° C., a surface tension of 15 to 60 mN/m (dyn/cm), more preferably 20 to 50 mN/m (dyn/cm) and a viscosity of 15 cP or lower, particularly 10 cP or lower. The pH is preferably within a range of from 3 to 11, more preferably from 3.5 to 10.

As specific examples of the ink composition capable of achieving such properties, may be mentioned various kinds of inks used in EXAMPLES which will be described subsequently.

To the inks according to this embodiment, may be added various kinds of additives such as surfactants, pH adjustors and mildewproofing agents in addition to the colored fine resin particles obtained in the above-described manner.

No particular limitation is imposed on recording media used in the recording process using the inks according to this embodiment, and examples thereof include plain paper such as paper for copying and bond paper, coated paper specially prepared for ink-jet recording, glossy paper, and films for OHP.

The inks according to the present invention are particularly preferably used in an ink-jet recording system in which droplets are ejected by the action of thermal energy to conduct recording. However, it goes without saying that the inks may be used in any other ink-jet recording systems or general writing utensils As a preferred recording apparatus for conducting recording by using the inks according to the present invention, may be mentioned an apparatus in which thermal energy corresponding to recording signals is applied to an ink within a recording head, and droplets of the ink are generated by the thermal energy.

Figure 2:
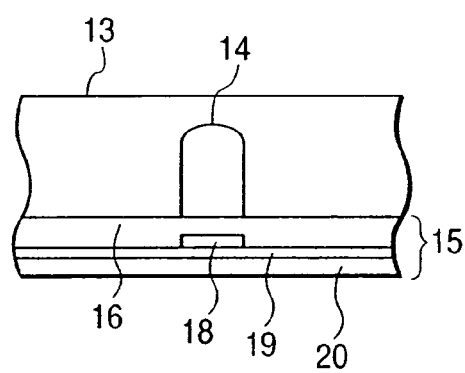
FIG. 2 is a cross-sectional view of the head taken along line 2—2 in FIG. 1.
Figure 3:
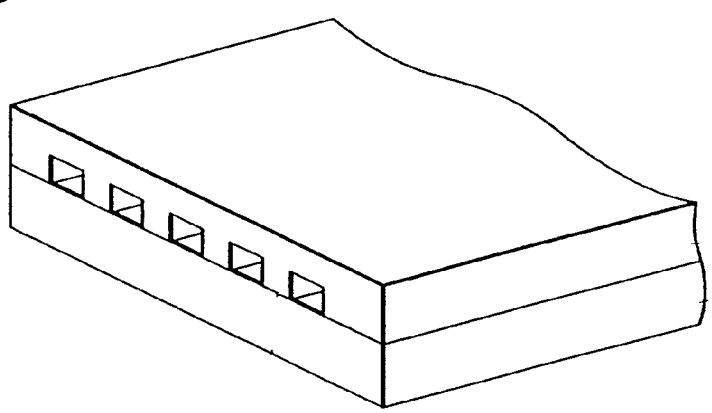
FIG. 3 is a schematic perspective view illustrating the appearance of a head of an ink-jet recording apparatus.

Examples of the construction of a recording head, which is a main component of such an apparatus, are illustrated in FIGS. 1, 2 and 3. A head 13 is formed by bonding a glass, ceramic or plastic plate or the like having a groove 14 through which an ink is passed, to a heating head 15 having a heating resistor, which is used for thermal recording (the drawings show a head to which, however, the invention is not limited) The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

Figure 4:
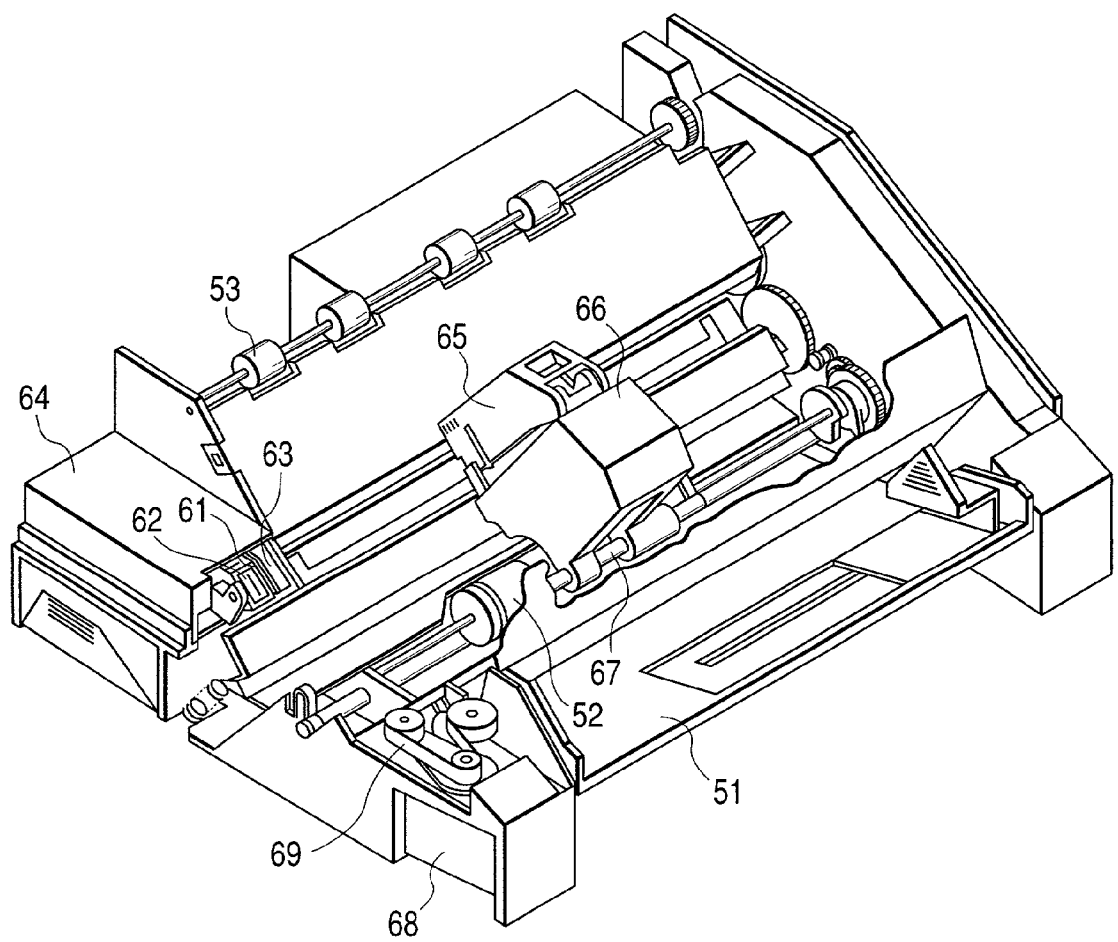
FIG. 4 is a perspective view illustrating an exemplary ink-jet recording apparatus.

An ink 21 is filled up to an ejection orifice (minute opening) 22 and forms a meniscus 23 due to a pressure P. FIG. 4 illustrates an example of an ink-jet recording apparatus in which such a head as described above has been incorporated. In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved. Reference numeral 62 indicates a cap for a face of ejection openings of the recording head 65, which is provided at a home position adjacent to the blade 61, and is so constructed that it moves in a direction perpendicular to a direction in which the recording head 65 is moved, and comes into contact with the face of ejection openings to cap it. Reference numeral 63 denotes an ink-absorbing member provided adjoiningly to the blade 61 and, similar to the blade 61, held in such a form that it protrudes into the course through which the recording head 65 is moved.

The above-described blade 61, cap 62 and absorbing member 63 constitute an ejection-recovery portion 64, where the blade 61 and absorbing member 63 remove water, dust and/or the like from the face of the ink-ejecting openings. Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a paper feeding part from which the recording media are separately inserted, and paper feed rollers driven by a motor (not illustrated), respectively. With such a construction, the recording medium is fed to the position opposite to the ejection opening face of the recording head 65, and discharged from a discharge section provided with discharge rollers 53 with the progress of recording. In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
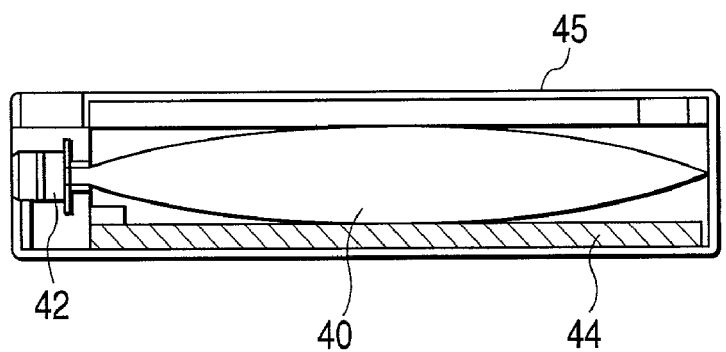
FIG. 5 is a longitudinal cross-sectional view of an ink cartridge.

FIG. 5 is a cross-sectional view illustrating an exemplary ink cartridge 45 equipped with an ink container portion containing an ink to be fed to the head through an ink-feeding member, for example, a tube. Here, reference numeral 40 designates the ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink.

Figure 6:
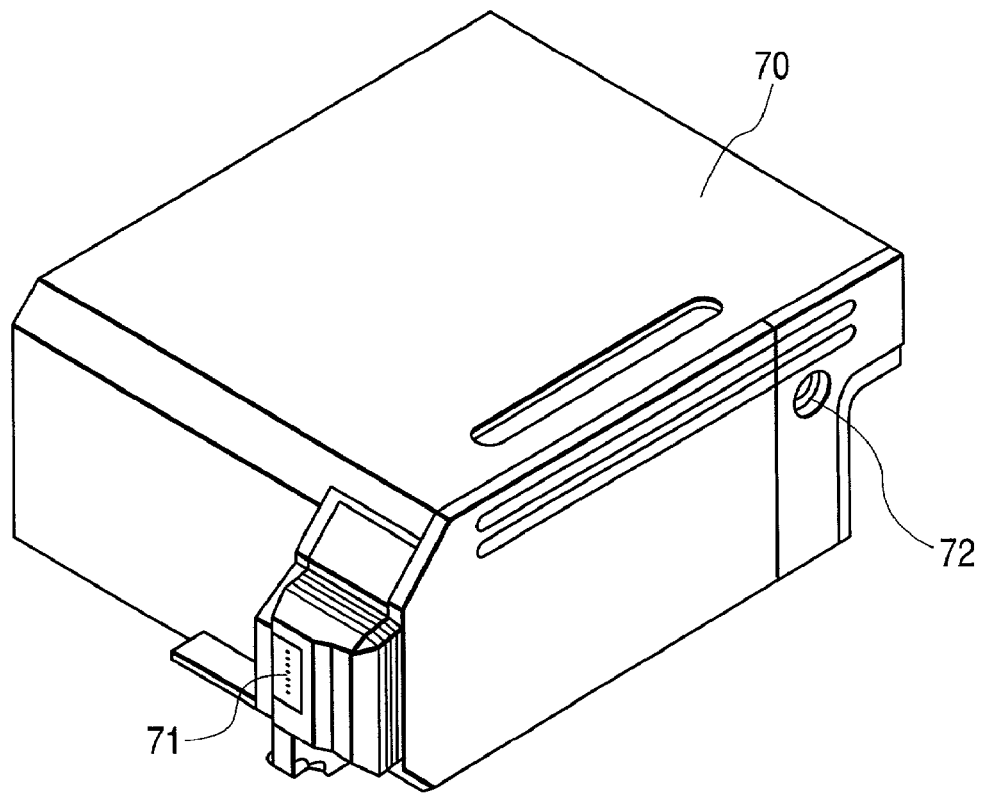
FIG. 6 is a perspective view of a recording unit.

The ink-jet recording apparatus used in the present invention are not limited to the apparatus as described above in which the head and the ink cartridge are separately provided. Therefore, a device in which these members are integrally formed as shown in FIG. 6 can also be preferably used. In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. Reference numeral 72 indicates an air passage for communicating the interior of the recording unit 70 with the atmosphere. This recording unit 70 can be used in place of the recording head 65 shown in FIG. 4, and is detachably installed on the carriage 66.

The present invention will hereinafter be described more specifically by the following Examples and Comparative Examples. However, the present invention is not limited to and by these examples so far as the subject matter of the present invention is not overstepped. Incidentally, all designations of "%" and "part" or "parts" as will be used in the following examples mean % by mass and part or parts by mass unless expressly noted.

EXAMPLE 1

(Preparation of Aqueous Dispersion A of Colored Fine Resin Particles)

Four parts of a processed pigment, "Microlith Blue 4G-KP" (trade name; pigment concentration: 50%; product of Ciba Specialty Chemicals Co., Ltd.) composed of Phthalocyanine Blue (C.I. Pigment Blue 15:3) and a vinyl chloride/vinyl acetate copolymer resin were added to a mixture of 4 parts of methyl methacrylate and 6 parts of n-butyl acrylate, and the resultant mixture was stirred by a stirrer to disperse the pigment. The average particle diameter of the pigment dispersed in the monomer mixture was 135 nm. Then, 2 parts of a reactive emulsifier, "Aqualon HS-20" (trade name, product of Dai-ichi Kogyo Seiyaku Co., Ltd.) as an emulsifier and 0.36 parts of 1,1-azobisisobutyronitrile as a polymerization initiator were mixed with the dispersion.

Water was added to the resultant mixture to conduct emulsification by means of a homogenizer. Water was additionally added to the resultant emulsion to adjust the proportion of other components than water so as to reach 40%. The thus-adjusted mixture was charged into a polymerization vessel equipped with a stirrer, a reflux condenser and a nitrogen gas inlet tube and heated to 75° C. under nitrogen atmosphere to conduct polymerization for 24 hours, thereby obtaining Aqueous Dispersion A of colored fine resin particles.

EXAMPLE 2

(Preparation of Aqueous Dispersion B of Colored Fine Resin Particles)

Aqueous Dispersion B of colored fine resin particles was prepared in the same manner as in EXAMPLE 1 except that the processed pigment was changed to 2 parts of "Microlith Blue G-AB" (trade name; pigment concentration: 70%; product of Ciba Specialty Chemicals Co., Ltd.) composed of Phthalocyanine Blue (C.I. Pigment Blue 15:3) and a polyvinyl butyral resin. The average particle diameter of the pigment dispersed in the monomer mixture was 156 nm.

EXAMPLE 3

(Preparation of Aqueous Dispersion C of Colored Fine Resin Particles)

Aqueous Dispersion C of colored fine resin particles was prepared in the same manner as in EXAMPLE 1 except that the processed pigment was changed to 4 parts of "hi-di Color Chip CB" (trade name; pigment concentration: 40%; product of Taihei Chemicals Limited) composed of Phthalocyanine Blue (C.I. Pigment Blue 15:3) and a cellulose resin. The average particle diameter of the pigment dispersed in the monomer mixture was 165 nm.

EXAMPLE 4

(Preparation of Aqueous Dispersion D of Colored Fine Resin Particles)

Aqueous Dispersion D of colored fine resin particles was prepared in the same manner as in EXAMPLE 1 except that the processed pigment was changed to 4 parts of "hi-di Color Chip AC" (trade name; pigment concentration: 40%; product of Taihei Chemicals Limited) composed of Phthalocyanine Blue (C.I. Pigment Blue 15:3) and an acrylic resin. The average particle diameter of the pigment dispersed in the monomer mixture was 173 nm.

EXAMPLE 5

(Preparation of Aqueous Dispersion E of Colored Fine Resin Particles)

Five parts of Phthalocyanine Blue (C.I. Pigment Blue 15:3) were added to a solution with 5 parts of a vinyl chloride/vinyl acetate copolymer resin, "VYHH" (trade name, product of Union Carbide Corp.) dissolved in 90 parts of dimethylformamide (DMF) and dispersed by a sand mill. The average particle diameter of the pigment after the dispersion was 140 nm. Under stirring, 270 parts of methanol were gradually added to the dispersion to aggregate the pigment coated with the resin. This pigment was collected by filtration and dried under reduced pressure to prepare a resin-coated pigment.

Four parts of the resin-coated pigment obtained above were added to a mixture of 4 parts of styrene and 6 parts of 2-ethylhexyl acrylate, and the resultant mixture was stirred by a stirrer to disperse the pigment. The average particle diameter of the pigment dispersed in the monomer mixture was 144 nm. Two parts of a reactive emulsifier, "Eleminol JS-2" (trade names, products of Sanyo Chemical Industries, Ltd.) as an emulsifier and 0.36 parts of 1,1-azobisisobutyronitrile as a polymerization initiator were mixed with the dispersion. Water was added to the resultant mixture to conduct emulsification by means of a homogenizer.

Water was additionally added to the resultant emulsion to adjust the proportion of other components than water so as to reach 40%. The thus-adjusted mixture was charged into a polymerization vessel equipped with a stirrer, a reflux condenser and a nitrogen gas inlet tube and heated to 75° C. under nitrogen atmosphere to conduct polymerization for 24 hours, thereby obtaining Aqueous Dispersion E of colored fine resin particles.

COMPARATIVE EXAMPLE 1

A solution with a polymer dispersant, "Disperbyk 161" (trade name; product of Byk Chem Japan K.K.) dissolved in an amount of 2 parts in terms of solids, 2 parts of Phthalocyanine Blue (C.I. Pigment Blue 15:3) and 10 parts of glass beads having a diameter of 0.5 mm were added to a mixture of 4 parts of methyl methacrylate and 6 parts of n-butyl acrylate, and the resultant mixture was adjusted to the same pigment concentration as in EXAMPLE 1 to try dispersing by means of a sand mill. However, the dispersion adhered to the inner wall and lid of the vessel of the sand mill to fail to satisfactorily disperse the pigment.

COMPARATIVE EXAMPLE 2

(Preparation of Aqueous Dispersion F of Colored Fine Resin Particles)

A solution with a polymer dispersant, "Disperbyk 161" (trade name; product of Byk Chem Japan K.K.) dissolved in an amount of 1 part in terms of solids, 1 part of Phthalocyanine Blue (C.I. Pigment Blue 15:3) and 10 parts of glass beads having a diameter of 0.5 mm were added to a mixture of 4 parts of methyl methacrylate and 6 parts of n-butyl acrylate and dispersed for 16 hours by a sand mill. The average particle diameter of the pigment dispersed in the monomer mixture was 350 nm. Emulsification and polymerization were performed in the same manner as in EXAMPLE 1 except that this dispersion was used, thereby obtaining Aqueous Dispersion F of colored fine resin particles.

(Evaluation Results of Colored Fine Resin Particle Dispersions)

Particle Diameter:

The average particle diameter of each colored fine resin particle dispersion was measured at a liquid temperature of 25° C. by the dynamic light scattering method (measuring equipment: ELS-8000, trade name, manufactured by Otsuka Denshi K.K.). The average particle diameter was found by the cumulant analysis from the scattering intensity by using attached software.

Shelf Stability:

Each colored fine resin particle dispersion was placed in a container coated with a fluororesin and closed to store it for a month at 5° C. and 60° C. The shelf stability was evaluated by visually observing whether gelling and/or precipitation occurred or not. The evaluation results were ranked in the following manner.

A: Gelling and/or precipitation was scarcely observed;
B: Gelling and/or precipitation was slightly observed, but no problem arose from the viewpoint of practical use;
C: Gelling and/or precipitation was observed to a great extent.

The evaluation results are shown in Table 1.

TABLE 1

| | Average particle Diameter (nm) | Shelf stability 5° C. | Shelf stability 60° C. |
|---|---|---|---|
| Ex. 1 | 135 | A | B |
| Ex. 2 | 156 | A | B |
| Ex. 3 | 165 | B | B |
| Ex. 4 | 173 | B | B |
| Ex. 5 | 140 | A | B |
| COMP. EX. 1 | — | — | — |
| COMP. EX. 2 | 350 | C | C |

EXAMPLES 6 to 10 and COMPARATIVE EXAMPLE 3

(Preparation and Evaluation of Ink)

Fifty parts of the resultant colored fine resin particle dispersions A to F were separately added to 5 parts of glycerol, 5 parts of ethylene glycol, 5 parts of trimethylolpropane, 1 part of Acetylenol EH and 34 parts of water, and the resultant mixtures were stirred. The mixtures were filtered to obtain inks according to EXAMPLES 6 to 10 and an ink according to COMPARATIVE EXAMPLE 3.

(Shelf Stability)

Each ink was placed in a container coated with a fluororesin and closed to store it for a month at 5° C. and 60° C. The shelf stability was evaluated by visually observing whether gelling and/or precipitation occurred or not. The evaluation results were ranked in the following manner.

A: Gelling and/or precipitation was scarcely observed;
B: Gelling and/or precipitation was slightly observed, but no problem arose from the viewpoint of practical use;
C: Gelling and/or precipitation was observed to a great extent.

(Ejection Stability)

An ink tank of a BJ cartridge BC-21 installed in a color BJ printer (BJC-420J, trade name, manufactured by Canon Inc.) was charged with each of the six inks obtained above, and this cartridge was set in BJC-420J to conduct printing on recording paper (Prophoto Paper for photograph, PR-101; product of Canon Inc.) in accordance with the mode of plain paper, 360×360 dpi and HQ of BJC-420J.

A vertical line of a dot was printed on the recording paper at the beginning of use of the BC-21 cartridge. Test printing was conducted until the ink contained in the BC-21 cartridge was consumed, and a vertical line of a dot was printed on another recording paper by using the cartridge right before the ink was consumed. These recording paper sheets were visually observed from a distance 25 cm away to evaluate the printed result by the cartridge at the beginning of use and the printed result by the cartridge right before the end of use in accordance with the following standard.

A: No difference was observed between both;
B: Impact deviation of dot was observed on a part of the vertical line printed by the cartridge right before the end of use, but the line was able to be recognized as a straight line;
C: Impact deviation of dot was clearly observed on the vertical line printed by the cartridge right before the end of use, and the vertical line was recognized with slippage.

(Optical Density of Image)

Each solid printed image sample was left to stand for 12 hours after printing, and at this time, the optical density of the image sample was measured by means of a reflection densitometer, Macbeth RD-918 (manufactured by Macbeth Company). The evaluation results were ranked in the following manner.

A: Optical density of 1.50 or higher;
B: Optical density of 1.31 to 1.49;
C: Optical density of 1.30 or lower.

(Water Fastness)

After a solid image was printed with each of the six inks obtained above and was left to stand for 24 hours, the optical density of the print was measured by means of a reflection densitometer, Macbeth RD-918 (manufactured by Macbeth Company). After the print was then left at rest for 5 minutes in tap water, it was dried to measure its optical density again, whereby the percent retention of the optical density between the print before the water fastness test and the print after the water fastness test was found to use it as an index to the water fastness. The evaluation results were ranked in the following manner.

A: Percent retention of the optical density was not lower than 80%;
B: Percent retention of the optical density was not lower than 70%, but lower than 80%;
C: Percent retention of the optical density was lower than 70%.

(Rub-Off Resistance)

After a solid image was printed with each of the six inks obtained above and was left to stand for 12 hours, Silbon paper was placed on the printed paper, and a weight 5 cm in each side and 1 kg in weight was additionally placed thereon. Thereafter, the Silbon paper was drawn out to visually observe whether stain occurred on the blank area of the printed paper and the Silbon paper due to rubbing of the printed area or not.

A: No stain was observed on both blank area and Silbon paper;
B: Stain was observed only on Silbon paper;
C: Stain was observed on both blank area and Silbon paper.

The results of the above-described tests were shown in Table 2:

TABLE 2

| Colored fine resin particles | Shelf stability 5° C. | Shelf stability 60° C. | Ejection stability | Optical density of image | Water fastness | Rub-off resistance |
|---|---|---|---|---|---|---|
| EX. 6 | A | A | B | A | A | A | A |
| EX. 7 | B | A | B | A | A | A | A |
| EX. 8 | C | B | B | B | B | A | A |
| EX. 9 | D | B | B | B | B | A | A |
| EX. 10 | E | A | B | A | A | A | A |
| COMP. EX. 3 | F | C | C | C | C | A | A |

EXAMPLES 11 to 14 and COMPARATIVE EXAMPLE 4

(Preparation of Aqueous Dispersions of Colored Fine Resin Particles and Evaluation Results)

(Preparation of Aqueous Dispersions of Colored Fine Resin Particles)

EXAMPLE 11

<Preparation of Aqueous Dispersions G of Colored Fine Resin Particles>

A solution with a polymer dispersant, "Disperbyk 161" (trade name; product of Byk Chem Japan K.K.) dissolved in an amount of 1 part in terms of solids, 1 part of Phthalocyanine Blue (C.I. Pigment Blue 15:3) as a colorant and 10 parts of glass beads having a diameter of 0.5 mm were added to a mixture of 4 parts of methyl methacrylate and 6 parts of n-butyl acrylate as polymerizable unsaturated monomers and dispersed for 16 hours by a sand mill. After the glass beads were removed, 2 parts of a reactive emulsifier, "Eleminol JS-2" (trade names, products of Sanyo Chemical Industries, Ltd.) as an emulsifier and 0.36 parts of 2,2-azobisisobutyro-nitrile as a polymerization initiator were mixed with the dispersion.

Water was gradually added to the resultant mixture under stirring by a glass rod, and stirring was more strongly conducted by the glass rod at the time the viscosity of the mixture was increased. At the phase inversion point, stirring was fully conducted, and water was additionally added to cause the resultant emulsion to phase-invert, thereby obtaining an emulsion. Water was additionally added to the resultant emulsion to adjust the proportion of other components than water so as to reach 20%. The thus-adjusted mixture was charged into a polymerization vessel (a polymerization vessel equipped with a stirrer, a reflux condenser and a nitrogen gas inlet tube) and heated to 75° C. under nitrogen atmosphere to conduct polymerization for 24 hours, thereby obtaining Aqueous Dispersion G of colored fine resin particles.

EXAMPLE 12

<Preparation of Aqueous Dispersions H of Colored Fine Resin Particles>

Four parts of styrene and 6 parts of n-butyl acrylate as polymerizable unsaturated monomers, 1 part of a processed pigment, "Microlith Blue 4G-KP" (trade name; pigment concentration: 50%; product of Ciba Specialty Chemicals Co., Ltd.) composed of Phthalocyanine Blue (C.I. Pigment Blue 15:3) and a vinyl chloride/vinyl acetate copolymer resin as a colorant, 2 parts of a reactive emulsifier, "Eleminol JS-2" (trade names, products of Sanyo Chemical Industries, Ltd.) as an emulsifier and 0.36 parts of 2,2-azobisisobutyro-nitrile as a polymerization initiator were mixed with one another.

Water was gradually added to the resultant mixture under stirring by a glass rod, and stirring was more strongly conducted by the glass rod at the time the viscosity of the mixture was increased. At the phase inversion point, stirring was fully conducted, and water was additionally added to cause the resultant emulsion to phase-invert, thereby obtaining an emulsion. Polymerization was conducted in the same manner as in EXAMPLE 1 except that the resultant emulsion was used, thereby obtaining Aqueous Dispersion H of colored fine resin particles.

EXAMPLE 13

<Preparation of Aqueous Dispersions I of Colored Fine Resin Particles>

Four parts of methyl methacrylate and 6 parts of n-butyl acrylate as polymerizable unsaturated monomers, 1 part of a processed pigment, "Microlith Blue 4G-KP" (trade name; pigment concentration: 50%; product of Ciba Specialty Chemicals Co., Ltd.) composed of Phthalocyanine Blue (C.I. Pigment Blue 15:3) and a vinyl chloride/vinyl acetate copolymer resin as a colorant, 2 parts of a reactive emulsifier, "Adeka Reasoap SE-10N" (trade name, product of Asahi Denka Kogyo K.K.) as an emulsifier and 0.36 parts of 2,2-azobisisobutyro-nitrile as a polymerization initiator were mixed with one another.

Water was gradually added to the resultant mixture under stirring by a homomixer, and stirring was more strongly conducted by increasing the rotation speed at the time the viscosity of the mixture was increased. At the phase inversion point, stirring was fully conducted, and water was additionally added to cause the resultant emulsion to phase-invert, thereby obtaining an emulsion. Polymerization was conducted in the same manner as in EXAMPLE 1 except that the resultant emulsion was used thereby obtaining Aqueous Dispersion I of colored fine resin particles.

EXAMPLE 14

<Preparation of Aqueous Dispersions J of Colored Fine Resin Particles>

Emulsification and polymerization were performed in the same manner as in EXAMPLE 1 except that 4 parts of methyl methacrylate and 6 parts of 2-ethylhexyl acrylate as polymerizable unsaturated monomers and 2 parts of a reactive emulsifier, "Aqualon HS-20" (trade name, product of Dai-ichi Kogyo Seiyaku Co., Ltd.) as an emulsifier were used, thereby obtaining Aqueous Dispersion J of colored fine resin particles.

COMPARATIVE EXAMPLE 4

<Preparation of Aqueous Dispersions K of Colored Fine Resin Particles>

A solution with a polymer dispersant, "Disperbyk 161" (trade name; product of Byk Chem Japan K.K.) dissolved in an amount of 1 part in terms of solids, 1 part of Phthalocyanine Blue (C.I. Pigment Blue 15:3) as a colorant and 10 parts of glass beads having a diameter of 0.5 mm were added to a mixture of 4 parts of methyl methacrylate and 6 parts of n-butyl acrylate as polymerizable unsaturated monomers and dispersed for 16 hours by a sand mill. After the glass beads were removed, 0.36 parts of 2,2-azobisisobutyronitrile as a polymerization initiator were mixed with the dispersion.

The above-prepared colorant dispersion was added to a solution with 2 parts of a reactive emulsifier, "Eleminol JS-2" (trade names, products of Sanyo Chemical Industries, Ltd.) as an emulsifier dissolved in 53.44 parts of water, and the mixture was stirred by a homomixer to obtain an emulsion. The thus-obtained emulsion was charged into a polymerization vessel (a polymerization vessel equipped with a stirrer, a reflux condenser and a nitrogen gas inlet tube) and heated to 75° C. under nitrogen atmosphere to conduct polymerization for 24 hours, thereby obtaining Aqueous Dispersion K of colored fine resin particles.

(Evaluation Results of Colored Fine Resin Particle Dispersions)

Particle Diameter:

The average particle diameter of each colored fine resin particle dispersion was measured at a liquid temperature of 25° C. by the dynamic light scattering method (measuring equipment: ELS-8000, trade name, manufactured by Otsuka Denshi K.K.). The average particle diameter was found by the cumulant analysis from the scattering intensity by using attached software. The particle size distribution was found likewise by determining the frequency distribution from the scattering intensity by the Marquadt analysis of the histogram method. The particle size distribution was found from the particle diameters at the time the cumulative values are 10% and 90% when the scattering intensity was cumulated from the small-particle diameter side.

Shelf Stability:

Each colored fine resin particle dispersion was placed in a container coated with a fluororesin and closed to store it for a month at 5° C. and 60° C. The shelf stability was evaluated by visually observing whether gelling and/or precipitation occurred or not. The evaluation results were ranked in the following manner.

A: Gelling and/or precipitation was scarcely observed;
B: Gelling and/or precipitation was slightly observed, but no problem arose from the viewpoint of practical use;
C: Gelling and/or precipitation was observed to a great extent.

The evaluation results are shown in Table 3.

TABLE 3

| | Average particle diameter (nm) | 10% cumulative value (nm) | 90% cumulative value (nm) | Shelf stability 5° C. | Shelf stability 60° C. |
|---|---|---|---|---|---|
| EX. 11 | 280 | 180 | 425 | B | B |
| EX. 12 | 280 | 176 | 430 | B | B |
| EX. 13 | 190 | 125 | 280 | A | A |
| EX. 14 | 230 | 135 | 340 | B | B |
| COMP. EX. 4 | 830 | 60 | 4,010 | C | C |

EXAMPLES 15 to 18 and COMPARATIVE EXAMPLE 5

(Preparation of Ink and Evaluation Results)

Aqueous Dispersions G to J of colored fine resin particles were used to prepare inks according to EXAMPLES 15 to 18. Twenty five parts of the resultant colored fine resin particle dispersions G to J were separately added to 10 parts of glycerol, 5 parts of ethylene glycol, 5 parts of trimethylolpropane, 1 part of Acetylenol EH and 54 parts of water, and the resultant mixtures were stirred. The mixtures were filtered to obtain inks according to EXAMPLES 15 to 18. An ink according to COMPARATIVE EXAMPLE 5 was obtained in the same manner as in EXAMPLES 15 to 18 except that Aqueous Dispersion K of colored fine resin particles was used.

(Shelf Stability)

Each ink was placed in a container coated with a fluororesin and closed to store it for a month at 5° C. and 60° C. The shelf stability was evaluated by visually observing whether gelling and/or precipitation occurred or not. The evaluation results were ranked in the following manner.

A: Gelling and/or precipitation was scarcely observed;
B: Gelling and/or precipitation was slightly observed, but no problem arose from the viewpoint of practical use;
C: Gelling and/or precipitation was observed to a great extent.

(Ejection stability)

An ink tank of a BJ cartridge BC-21 installed in a color BJ printer (BJC-420J, trade name, manufactured by Canon Inc.) was charged with each of the six inks obtained above, and this cartridge was set in BJC-420J to conduct printing on recording paper (Canon PB Paper for common use in BJ-electrophotograph, product of Canon Inc.) in accordance with the mode of plain paper, 360×360 dpi and HQ of BJC-420J. A vertical line of a dot was printed on the recording paper at the beginning of use of the BC-21 cartridge. Test printing was conducted until the ink contained in the BC-21 cartridge was consumed, and a vertical line of a dot was printed on another recording paper by using the cartridge right before the ink was consumed.

These recording paper sheets were visually observed from a distance 25 cm away to evaluate the printed result by the cartridge at the beginning of use and the printed result by the cartridge right before the end of use in accordance with the following standard.

A: No difference was observed between both;
B: Impact deviation of dot was observed on a part of the vertical line printed by the cartridge right before the end of use, but the line was able to be recognized as a straight line;
C: Impact deviation of dot was clearly observed on the vertical line printed by the cartridge right before the end of use, and the vertical line was recognized with slippage.

(Water Fastness)

After a solid image was printed with each of the inks obtained above and was left to stand for 24 hours, the optical density of the print was measured by means of a reflection densitometer, Macbeth RD-918 (manufactured by Macbeth Company). After the print was then left at rest for 5 minutes in tap water, it was dried to measure its optical density again, whereby the percent retention of the optical density between the print before the water fastness test and the print after the water fastness test was found to use it as an index to the water fastness. The evaluation results were ranked in the following manner.

A: Percent retention of the optical density was not lower than 80%;
B: Percent retention of the optical density was not lower than 70%, but lower than 80%;
C: Percent retention of the optical density was lower than 70%.

(Rub-Off Resistance)

After a solid image was printed with each of the inks obtained above and was left to stand for 12 hours, Silbon paper was placed on the printed paper, and a weight 5 cm in each side and 1 kg in weight was additionally placed thereon. Thereafter, the Silbon paper was drawn out to visually observe whether stain occurred on the blank area (white area) of the printed paper and the Silbon paper due to rubbing of the printed area or not.

A: No stain was observed on both white area and Silbon paper;
B: Stain was observed only on Silbon paper;
C: Stain was observed on both white area and Silbon paper.

The results of the above-described tests were shown in Table 4:

TABLE 4

| | Colored fine resin particles | Shelf stability 5° C. | Shelf stability 60° C. | Ejection stability | Water fastness | Rub-off resistance |
|---|---|---|---|---|---|---|
| EX. 15 | G | B | B | B | A | A |
| EX. 16 | H | B | B | B | A | A |
| EX. 17 | I | A | A | A | A | A |
| EX. 18 | J | B | B | A | A | A |
| COMP. EX. 5 | K | C | C | C | A | A |

As described above, according to the present invention, there can be provided colored fine resin particles useful as coloring materials for inks which can provide images having good water fastness, weather fastness and rub-off resistance and are excellent in dispersion stability.

What is claimed is:

1. Colored fine resin particles having an average particle diameter of 500 nm or smaller and having a structure in which a pigment coated with a water-insoluble resin is encapsulated with a copolymer composed of at least a polymerizable unsaturated monomer and a reactive emulsifier.

2. The colored fine resin particles according to claim 1, wherein the water-insoluble resin is at least one resin selected from the group consisting of a vinyl resin, cellulose resin and acrylic resin.

3. The colored fine resin particles according to claim 2, wherein the vinyl resin is a vinyl chloride-vinyl acetate copolymer resin.

4. The colored fine resin particles according to claim 1, wherein the pigment is metal phthalocyanine.

5. An ink comprising at least the colored fine resin particles according to claim 1 and a liquid medium.

6. The ink according to claim 5, which is suitable for use in ink-jet recording.

7. A recording unit comprising an ink container portion with the ink according to claim 6 held therein and a head for ejecting the ink.

8. An ink-jet recording apparatus comprising an ink container portion with the ink according to claim 6 held therein and a head for ejecting the ink.

9. An ink-jet recording process comprising the step of ejecting the ink according to claim 6 by an ink-jet system.

10. An ink cartridge comprising an ink container portion with the ink according to claim 5 held therein.

11. A process for producing colored fine resin particles having an average particle diameter of 500 nm or smaller, which comprises the steps of emulsifying a pigment coated with a water-insoluble resin, a polymerizable unsaturated monomer, a reactive emulsifier and a polymerization initiator in an aqueous medium, and polymerizing the polymerizable unsaturated monomer.

12. The production process according to claim 11, wherein the step of emulsifying comprises the sub-steps of dispersing the pigment coated with the water-insoluble resin, the reactive emulsifier and the polymerization initiator in the polymerizable unsaturated monomer, and emulsifying the dispersion in the aqueous medium.

13. The production process according to claim 11, wherein the water-insoluble resin is at least one resin selected from the group consisting of a vinyl resin, cellulose resin and acrylic resin.

14. The production process according to claim 13, wherein the vinyl resin is a vinyl chloride-vinyl acetate copolymer resin.

15. The production process according to claim 11, wherein the pigment is metal phthalocyanine.

16. An aqueous dispersion of colored fine resin particles, wherein the colored fine resin particles have an average particle diameter of 500 nm or smaller and have a structure in which a pigment coated with a water-insoluble resin is encapsulated with a copolymer composed of at least a polymerizable unsaturated monomer and a reactive emulsifier, and are in a dispersed state.

17. A process for producing colored fine resin particles having an average particle diameter of 500 nm or smaller, which comprises the steps of emulsifying at least a polymerizable unsaturated monomer, a colorant, an emulsifier and a polymerization initiator in an aqueous medium and polymerizing the polymerizable unsaturated monomer, wherein the colorant is a pigment, and wherein a phase-inversion emulsification method is used in the emulsifying step.

18. The process for producing colored fine resin particles according to claim 17, wherein the emulsifier is a reactive emulsifier, and the process further comprises a step of polymerizing the reactive emulsifier.

19. The process for producing colored fine resin particles according to claim 18, wherein the step of polymerizing the reactive emulsifier comprises a sub-step of copolymerizing with the polymerizable unsaturated monomer.

20. The process for producing colored fine resin particles according to claim 18, wherein the reactive emulsifier is contained in a proportion of 5 to 50% by mass based on the polymerizable unsaturated monomer.

21. The process for producing colored fine resin particles according to claim 17, wherein the colorant has compatibility with the polymerizable unsaturated monomer.

22. The process for producing colored fine resin particles according to claim 17, wherein the pigment is coated with a water-insoluble resin.

23. The process for producing colored fine resin particles according to claim 22, wherein the water-insoluble resin is at least one resin selected from the group consisting of a vinyl resin, cellulose resin and acrylic resin.

24. The process for producing colored fine resin particles according to claim 22, wherein the vinyl resin is a vinyl chloride-vinyl acetate copolymer resin.

25. The process for producing colored fine resin particles according to claim 17, wherein the polymerization initiator is an oil-soluble polymerization initiator soluble in the polymerizable unsaturated monomer.

26. The process for producing colored fine resin particles according to claim 25, wherein a suspension polymerization production process is used in the polymerizing step.

27. Colored fine resin particles obtained by the process for producing colored fine resin particles according to claim 17.

28. An ink comprising the colored fine resin particles according to claim 27 and a liquid medium.

29. The ink according to claim 28, wherein the liquid medium is aqueous.

30. The ink according to claim 28, wherein the liquid medium is oily.

31. The ink according to claim 28, which is suitable for use in ink-jet recording.

32. A recording unit comprising an ink container portion with the ink according to claim 31 held therein and a head for ejecting the ink.

33. An ink-jet recording apparatus comprising an ink container portion with the ink according to claim 31 held therein and a head for ejecting the ink.

34. An ink-jet recording process comprising the step of ejecting the ink according to claim 31 by an ink-jet system.

35. An ink cartridge comprising an ink container portion with the ink according to claim 28 held therein.

36. A process for producing an aqueous dispersion of colored fine resin particles having an average particle diameter of 500 nm or smaller, which comprises the steps of emulsifying at least a polymerizable unsaturated monomer, a pigment as a colorant, an emulsifier and a polymerization initiator in an aqueous medium and polymerizing the polymerizable unsaturated monomer, wherein a phase-inversion emulsification method is used in the emulsifying step.

* * * * *

UNITED STATES PATENT AND TRADEMARK OFFICE
CERTIFICATE OF CORRECTION

| | |
|---|---|
| PATENT NO. | : 7,008,977 B2 |
| APPLICATION NO. | : 10/179844 |
| DATED | : March 7, 2006 |
| INVENTOR(S) | : Junichi Sakai et al. |

Page 1 of 1

It is certified that error appears in the above-identified patent and that said Letters Patent is hereby corrected as shown below:

<u>Column 7</u>

Line 10, "emulsifier" should read --emulsifiers--.

<u>Column 11</u>

Line 21, "10-%" should read --10%--.

Signed and Sealed this

Nineteenth Day of December, 2006

JON W. DUDAS
*Director of the United States Patent and Trademark Office*